(12) United States Patent
Janikowski et al.

(10) Patent No.: US 7,323,105 B1
(45) Date of Patent: Jan. 29, 2008

(54) HIGH CAPACITY DIRECT FLOW FILTER WITH MAINTAINED CHANNEL WIDTH

(75) Inventors: Eric A. Janikowski, Jefferson, WI (US); Jason E. Dorgan, Madison, WI (US); Christopher E. Holm, Madison, WI (US); Z. Gerald Liu, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 359 days.

(21) Appl. No.: 10/916,300

(22) Filed: Aug. 11, 2004

(51) Int. Cl.
*B01D 27/06* (2006.01)
*B01D 29/07* (2006.01)

(52) U.S. Cl. ............... 210/493.1; 210/493.3; 210/493.4; 210/493.5

(58) Field of Classification Search ............. 210/493.1, 210/493.3, 493.4, 493.5; 55/521; B01D 27/07, B01D 29/07
See application file for complete search history.

(56) References Cited

U.S. PATENT DOCUMENTS

| | | | | |
|---|---|---|---|---|
| 2,936,855 | A | * | 5/1960 | Allen et al. .................... 55/498 |
| 3,401,077 | A | * | 9/1968 | Zink ........................... 162/117 |
| 3,531,920 | A | * | 10/1970 | Hart ............................. 55/497 |
| 3,567,023 | A | * | 3/1971 | Buckman et al. ........... 210/130 |
| 4,268,290 | A | * | 5/1981 | Barrington .................... 55/521 |
| 4,842,739 | A | | 6/1989 | Tang |
| 4,925,561 | A | * | 5/1990 | Ishii et al. ................ 210/493.3 |
| 5,066,400 | A | * | 11/1991 | Rocklitz et al. ......... 210/493.5 |
| 5,068,400 | A | | 11/1991 | Rocklitz et al. |
| 5,346,519 | A | | 9/1994 | Williams |
| 5,609,761 | A | | 3/1997 | Franz |
| 5,744,036 | A | | 4/1998 | Choi |
| 6,238,561 | B1 | | 5/2001 | Liu et al. |
| 6,375,700 | B1 | | 4/2002 | Jaroszczyk et al. |
| 6,391,076 | B1 | | 5/2002 | Jaroszczyk et al. |
| 6,402,800 | B1 | | 6/2002 | Rey |
| 6,416,561 | B1 | | 7/2002 | Kallsen et al. |
| 6,482,247 | B2 | | 11/2002 | Jaroszczyk et al. |
| 6,511,599 | B2 | | 1/2003 | Jaroszczyk et al. |
| 6,685,833 | B2 | | 2/2004 | Lippold |

\* cited by examiner

*Primary Examiner*—Krishnan Menon
*Assistant Examiner*—Benjamin Kurtz
(74) *Attorney, Agent, or Firm*—Andrus, Sceales, Starke & Sawall, LLP; J. Bruce Schelkopf (57) ABSTRACT

A direct flow filter includes a pleated filter element filtering fluid flowing axially therethrough parallel to the wall segment pleat tip bend lines. Embossments on the wall segments have a height extending along a lateral direction into a respective flow channel to maintain channel width and guiding and directing fluid axially into and along the flow channels from the upstream ends of the wall segments.

5 Claims, 9 Drawing Sheets

HIGH CAPACITY DIRECT FLOW FILTER WITH MAINTAINED CHANNEL WIDTH

BACKGROUND AND SUMMARY

The invention relates to fluid filters, and more particularly to direct flow filters.

The invention arose during continuing development efforts relating to direct flow filters. The filtration industry, including for automotive application, is driven towards more efficient space utilization, e.g. eliminating large open areas within a filter element and/or a filter housing between the filter element and the housing, which is particularly desirable in space constrained areas such as behind the cabin or under the hood of vehicles. Direct flow filters are effective for this purpose. A direct flow filter filters fluid flowing along an axial flow direction and includes a pleated filter element having a plurality of pleats defined by wall segments extending along a transverse direction between first and second sets of pleat tips at first and second sets of axially extending bend lines, the transverse direction being perpendicular to the axial direction. In a direct flow filter, fluid to be filtered flows axially into the channels, parallel to the noted bend lines. In contrast, in a transverse flow filter, fluid to be filtered flows across the pleats, transversely to the noted bend lines.

In the filtration industry, embossing is a common practice to maintain pleat spacing in a filter element. Standard embossment patterns have not been effective in a reduced size direct flow filter because of the flow direction. Furthermore, the pleat depth in a direct flow filter is typically greater than that in conventional or transverse flow filters.

The present invention provides improvements in direct flow filters. In one aspect, channel width is maintained, to provide higher capacity. An effective embossment pattern is provided for maintaining channel width, including as a dust cake begins to form on the filter element media. The embossment pattern provides support as the dust cake continues to build, and prevents collapse of the pleats which would otherwise cause the pressure drop to increase at a rapid pace. The invention provides a desirable flow pattern, reducing turbulence and allowing dust cake formation at a uniform distribution along the filter element.

BRIEF DESCRIPTION OF THE DRAWING

Prior Art

Present Invention

DETAILED DESCRIPTION

Prior Art

Figure 1:
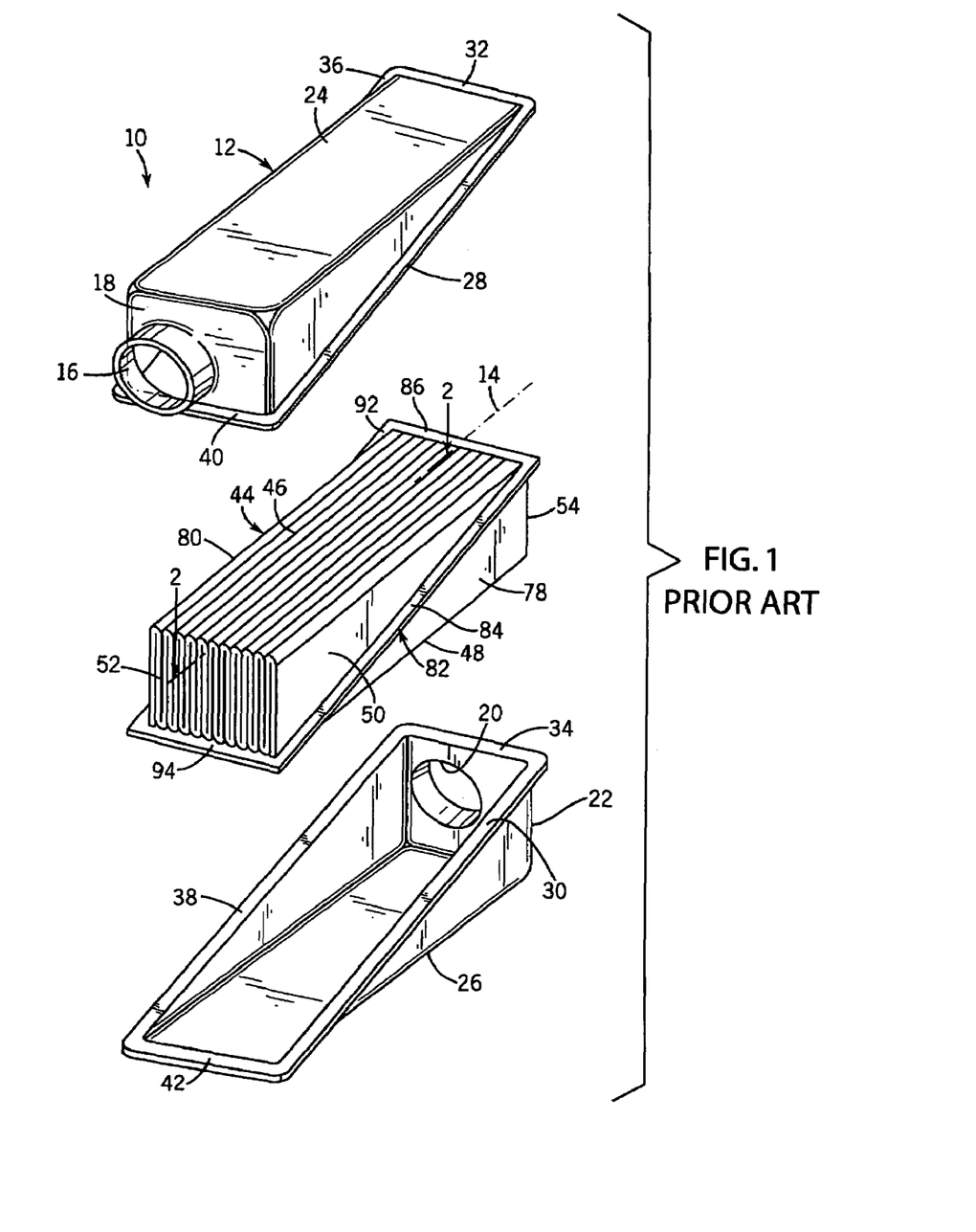
FIG. 1 is taken from FIG. 1 of U.S. Pat. No. 6,375,700, incorporated herein by reference.
Figure 2:
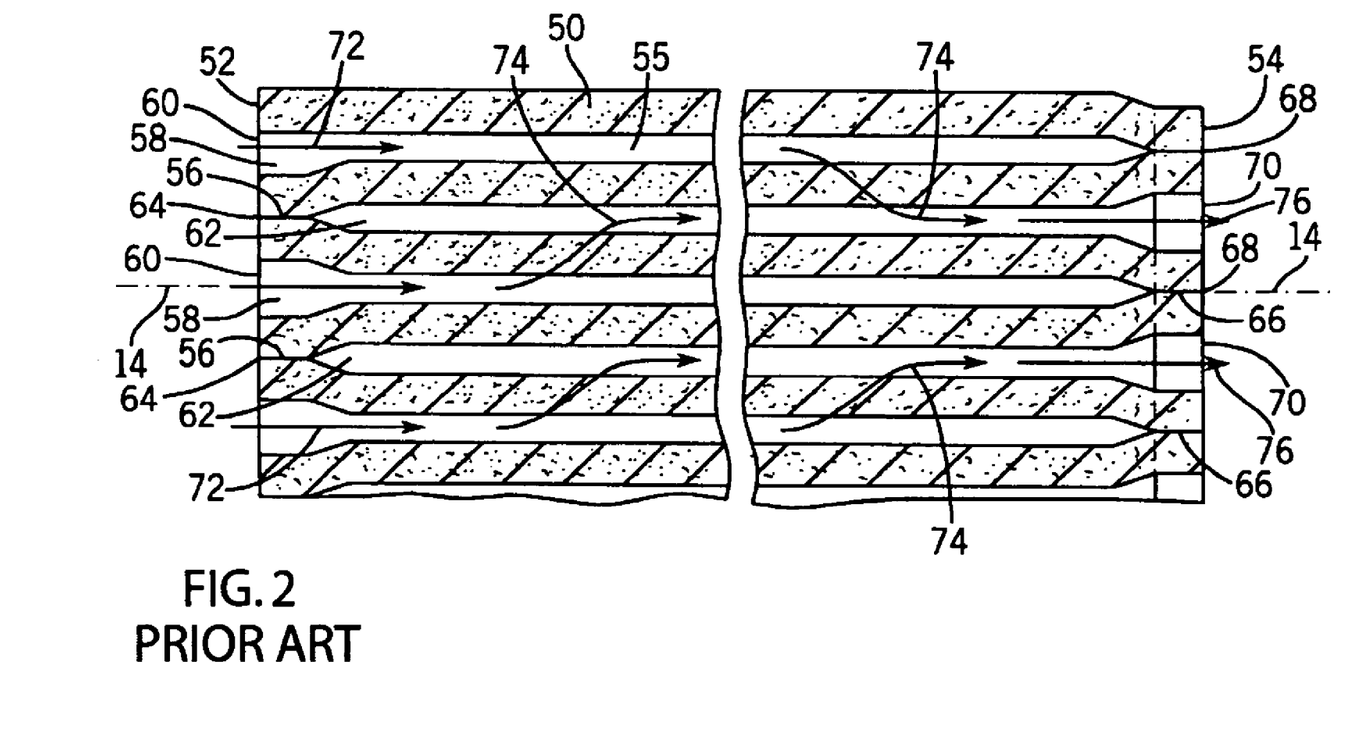
FIG. 2 is a sectional view taken along line 2-2 of FIG. 1, and is taken from FIG. 2 of the noted incorporated '700 patent.

The following description of FIGS. 1 and 2 is taken from the noted incorporated U.S. Pat. No. 6,375,700.

FIG. 1 shows a filter 10 including a housing 12 extending axially along axis 14 and having an inlet 16 at one axial end 18 of the housing and having an outlet 20 at a distally opposite axial end 22 of the housing. The housing is preferably plastic and provided by identical upper and lower half sections 24 and 26 mating along diagonal flanges 28, 30, lateral flanges 32, 34, diagonal flanges 36, 38, and lateral flanges 40, 42.

A pleated filter block is provided by pleated filter element 44 in the housing. The pleated filter element is pleated along a plurality of upper bend lines 46 and lower bend lines 48, which bend lines extend axially. The filter element has a plurality of wall segments 50 extending in serpentine manner between the upper and lower bend lines. The wall segments extend axially between upstream ends 52 at inlet 16, and downstream ends 54 at outlet 20. The wall segments define axial flow channels 55 therebetween, FIG. 2. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through filter element 44, namely from inlet 16 through open upstream ends 60 of the first set of flow channels 58 as shown at arrows 72, then through wall segments 50 as shown at arrows 74, then through open downstream ends 70 of the second set of flow channels 62 as shown at arrows 76, then to outlet 20. It is preferred that at least a portion of each of inlet 16 and outlet 20 are axially aligned.

Filter element 44 has laterally distally opposite right and left axially extending sides 78 and 80, FIG. 1, defining first and second axially extending planes. The second axial plane at side 80 is parallel to and spaced from the first axial plane at side 78. Upper bend lines 46 provide a first or upper set of coplanar bend lines defining a third axially extending plane. Lower bend lines 48 define a lower or second set of coplanar bend lines defining a fourth axially extending plane. The fourth axial plane at lower bend lines 48 is parallel to and spaced from the third axial plane at upper bend lines 46. The third and fourth axial planes are perpendicular to the noted first and second axial planes. Upstream ends 52 of wall segments 50 define a first laterally extending plane, and downstream ends 54 of the wall segments define a second laterally extending plane. The second lateral plane at downstream ends 54 is parallel to and spaced from the first lateral plane at upstream ends 52. The noted first and second lateral planes are perpendicular to the noted first and second axial planes and perpendicular to the noted third and fourth axial planes.

A gasket 82 is provided for sealing filter 44 to housing 12, including at gasket sections 84, 86, 92, 94, as described in the '700 patent, such that air entering inlet 16 cannot bypass the filter element to outlet 20, and instead must flow through the filter element as shown at arrows 72, 74, 76, FIG. 2. Further embodiments of the gasket are shown in the incorporated '700 patent at 82a, 82b, 82c.

Present Invention

Figure 3:
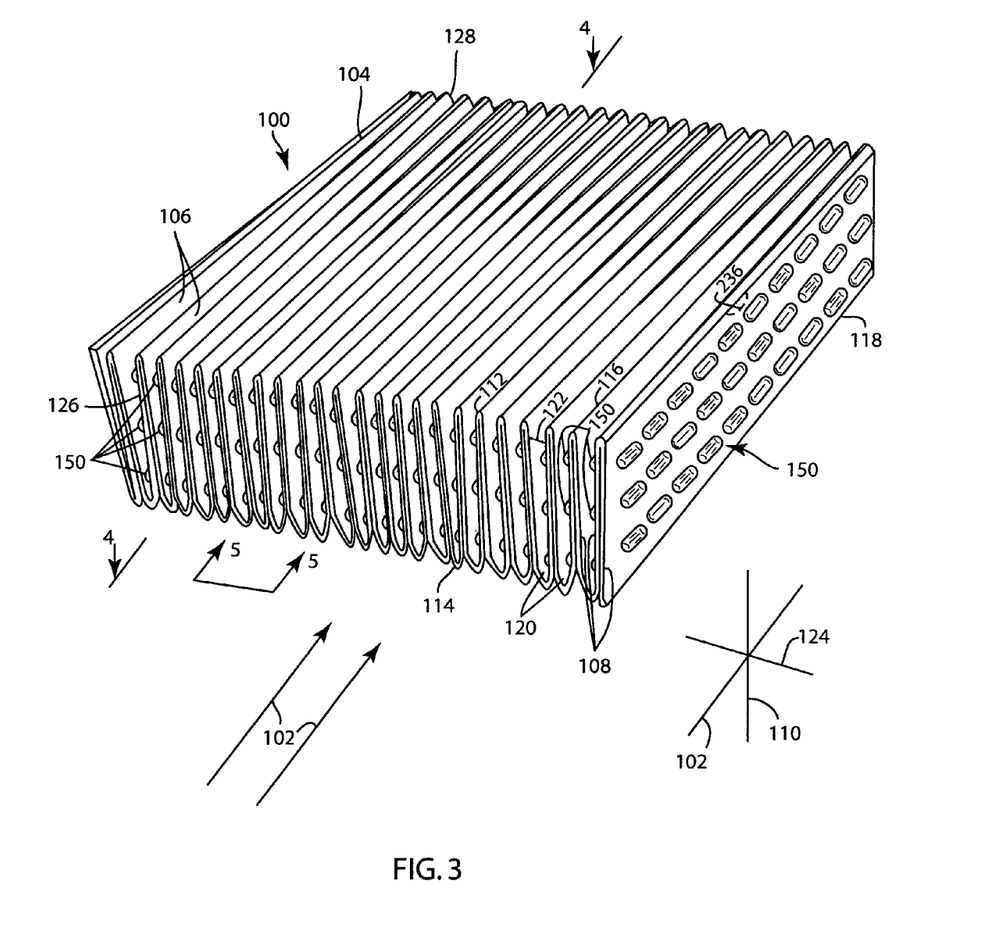
FIG. 3 is like a portion of FIG. 1 and shows a filter in accordance with the present invention.

FIG. 3 shows a filter 100 in accordance with the invention, and which may be housed in a housing such as 12, FIG. 1, or in other types of housings, including, inter alia, housing 12a shown in FIG. 5 of the incorporated '700 patent, and housings such as shown in U.S. Pat. Nos. 6,416,561, 6,482,247, 6,511,599, all incorporated herein by reference. Filter 100 filters fluid flowing along an axial flow direction 102. The filter is provided by a pleated filter element 104 having a plurality of pleats 106 defined by wall segments 108 extending along a transverse direction 110 between first and second sets of pleat tips 112 and 114 at first and second sets of axially extending bend lines 116 and 118. Transverse direction 110 is perpendicular to axial direction 102. Wall segments 108 define axial flow channels 120 therebetween. Channels 120 have a channel width 122, FIGS. 3, 4, extending along a lateral direction 124 between respective wall segments 108. Lateral direction 124 is perpendicular to axial direction 102 and perpendicular to transverse direction 110.

Wall segments 108 extend axially between upstream and downstream ends 126 and 128. Upstream ends 126 of wall segments 108 are alternately sealed to each other, for example at sealant 130, FIG. 4, to define a first set of flow channels 132 having open upstream ends 132a, and a second set of flow channels 134 interdigitated with the first set of flow channels 132 and having closed upstream ends 134a. Downstream ends 128 of wall segments 108 are alternately sealed to each other, for example at sealant 136, such that the first set of flow channels 132 have closed downstream ends 132b, and the second set of flow channels 134 have open downstream ends 134b. Fluid flows axially rightwardly in FIG. 4 as shown at 102 into open channel ends 132a, and then flows axially rightwardly through channels 132 and then passes through wall segments 108 as shown at arrows 138 into channels 134 and then exits axially rightwardly through open channel ends 134b, all as is known in the prior art and in accordance with FIGS. 1 and 2 above.

Figure 5:
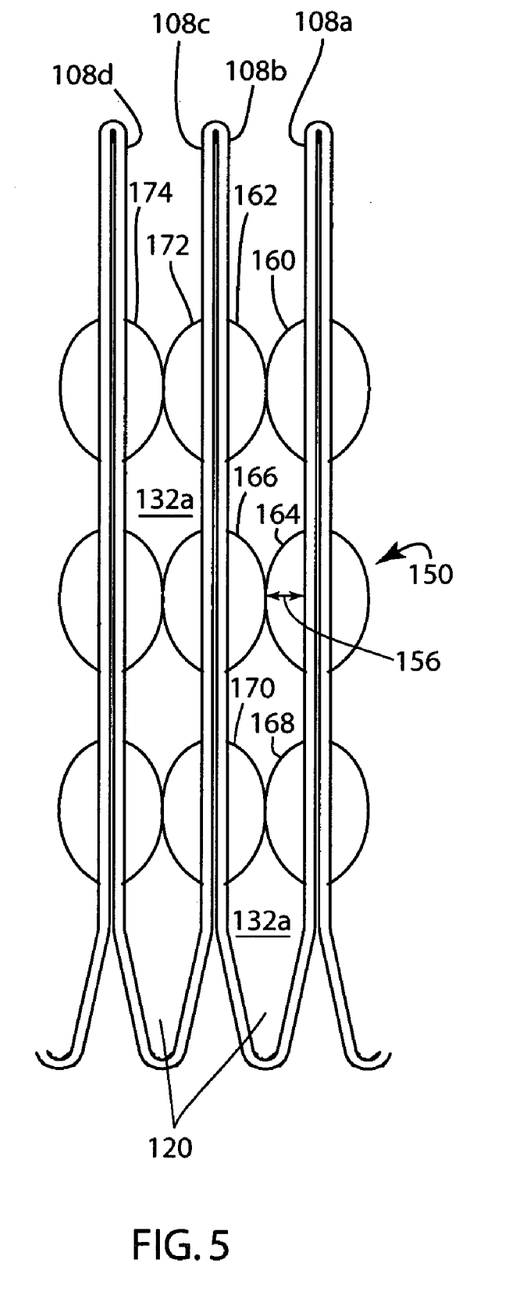
FIG. 5 is a front or inlet end elevation view of a portion of FIG. 3 taken along line 5-5 of FIG. 3.
Figure 6:
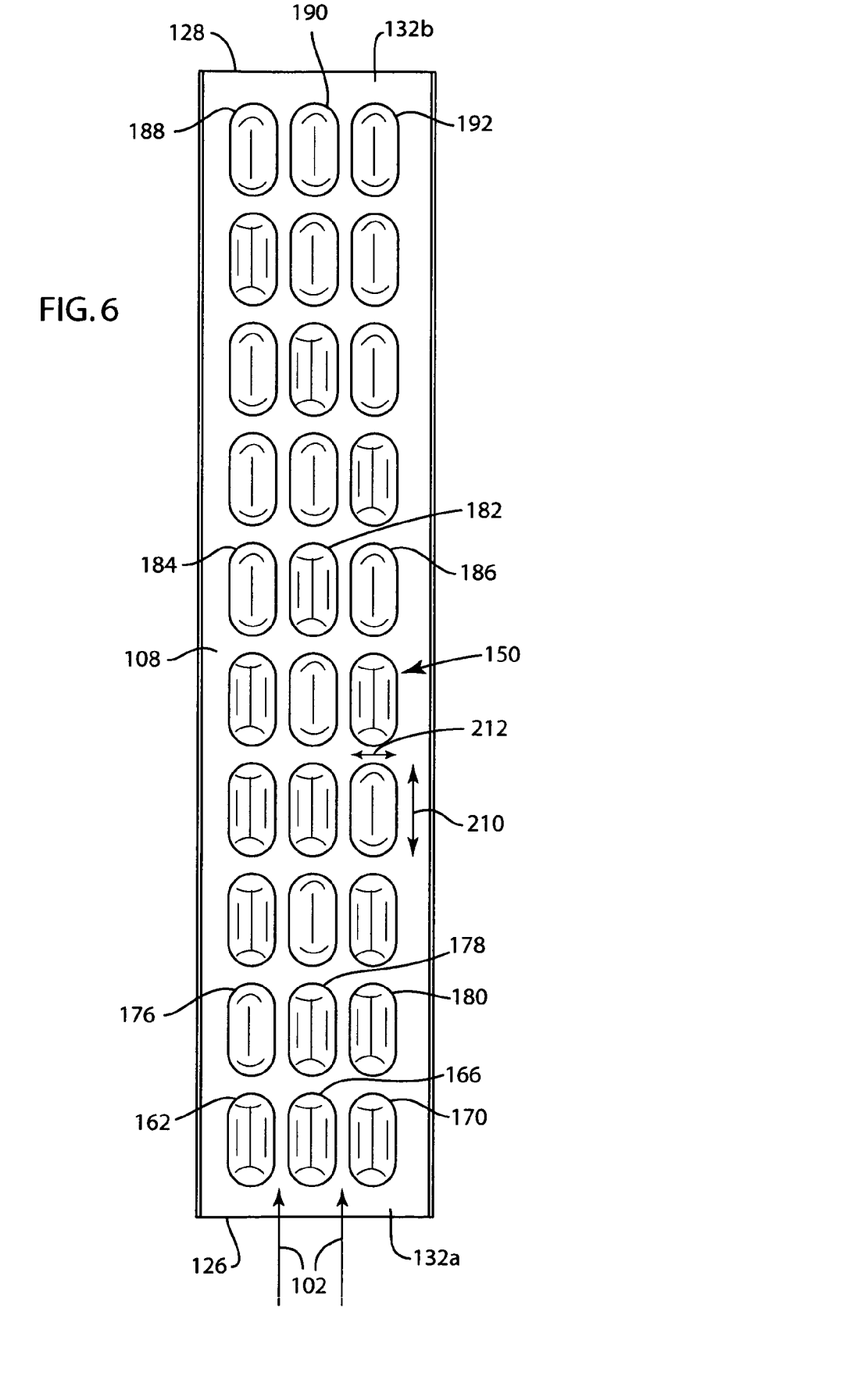
FIG. 6 is a side elevation view of one of the wall segments of FIG. 3.

A plurality of embossments 150, FIGS. 3, 6, are provided on wall segments 108. The embossments may be a deformation in the wall segment, such that the embossed wall segment portion has a convex surface 152, FIG. 4, and a concave surface 154. Alternatively, the embossments may be provided by protrusions or bumps glued or otherwise affixed to the wall segments, or the like. The embossments have a height 156, FIGS. 4, 5, extending along the noted lateral direction 124, FIG. 3, into a respective flow channel 120 to maintain the noted channel width 122. The embossments are preferably aligned with each other from wall segment to wall segment such that, for example FIGS. 5, 4, embossment 160 of wall segment 108a engages embossment 162 of wall segment 108b, and embossment 164 of wall segment 108a engages embossment 166 of wall segment 108b, and embossment 168 of wall segment 108a engages embossment 170 of wall segment 108b, and so on. Likewise in the next channel in FIG. 5, embossment 172 of wall segment 108c engages embossment 174 of wall segment 108d, and so on. In alternate embodiments, the embossments are not aligned, and a respective embossment engages the opposing wall segment across the channel. The embossments guide and direct incoming fluid at 102 axially into and along flow channels 120 from upstream ends 126 of the wall segments at open inlet channel ends 132a. The axial inlet flow is shown at 102 in FIGS. 3, 4, 6, and is into the page in FIG. 5.

Figure 4:
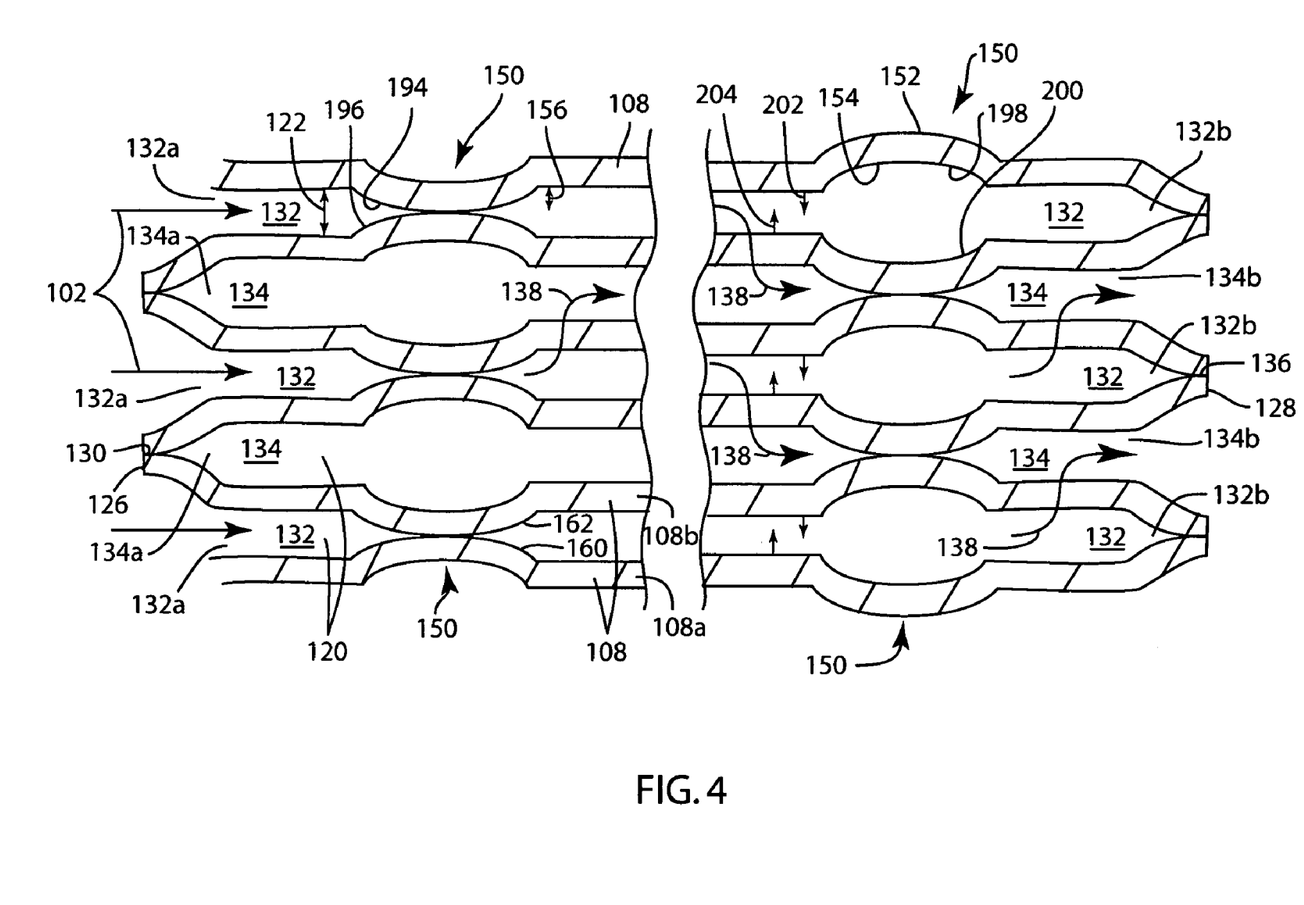
FIG. 4 is a sectional view taken along line 4-4 of FIG. 3, and is similar to FIG. 2.

At the upstream inlet end 126, which is the left end in FIGS. 3, 4, and the lower end in FIG. 6, the noted first set of flow channels 132 preferably have all convex embossments extending laterally inwardly into the channel from opposing wall segments, to maintain maximum channel width at the inlet. For example as shown in FIG. 5, convex embossment 160 of wall segment of 108a extends laterally inwardly (leftwardly in FIG. 5) into channel 132a and engages convex embossment 162 extending from wall segment 108b laterally inwardly into channel 132a. Likewise, convex embossments 164 and 166 extend laterally inwardly into the channel from opposing wall segments 108a and 108b. Likewise, convex embossments 168 and 170 extend laterally inwardly into channel 132a from opposing wall segments 108a and 108b. FIG. 6 shows a side elevation view of wall segment 108b and illustrates the first row of convex embossments 162, 166, 170 which extend out of the page in FIG. 6.

As the flow progresses into the channel, i.e. rightwardly in FIGS. 3, 4, and upwardly in FIG. 6, the next or a subsequent row of embossments may have fewer convex embossments, for example as shown in the second row in FIG. 6 having a concave embossment surface 176 and two convex embossment surfaces 178 and 180. The pattern of convex/concave embossment surfaces may continue to vary as the flow proceeds further into the channel, for example a further row may have a single convex embossment surface 182, FIG. 6, and two concave embossment surfaces 184 and 186. In the final row at the outlet end 128, it is preferred that all concave embossment surfaces are provided as shown at 188, 190, 192. In this manner, the channel width is maintained at a maximum at inlet end 126, and is allowed to collapse to a minimum channel width at outlet end 128. This is illustrated in FIG. 4 at convex embossment surfaces 194 and 196 at the inlet end, and concave embossment surfaces 198 and 200 at the outlet end. The facing convex surfaces 194 and 196 resist collapse of the channel and maintain full channel width 122. The facing concave surfaces 198 and 200 permit collapse of the channel as shown at arrows 202 and 204, whereat channel width need not be maintained because the end of such channel at 132b is closed. The channel width tapers from left to right in FIGS. 3 and 4, from a maximum channel width at the inlet end 126 to a minimum channel width at the outlet end 128. This provides higher capacity than non-embossed direct flow filters because the latter may be subject to channel collapse, particularly at the upstream end.

Figure 7:
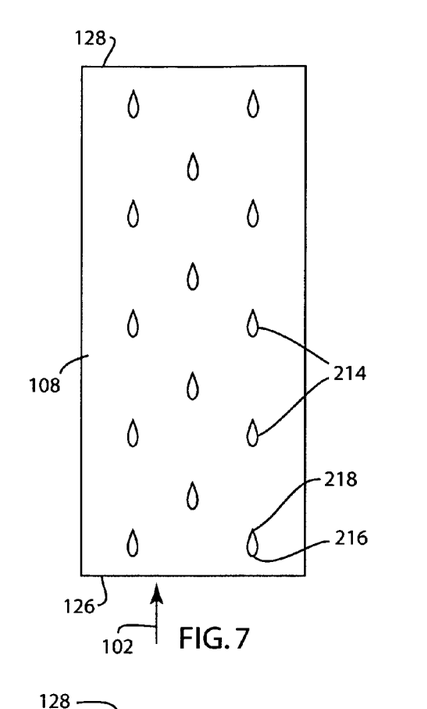
FIG. 7 is like FIG. 6 and shows another embodiment.
Figure 8:
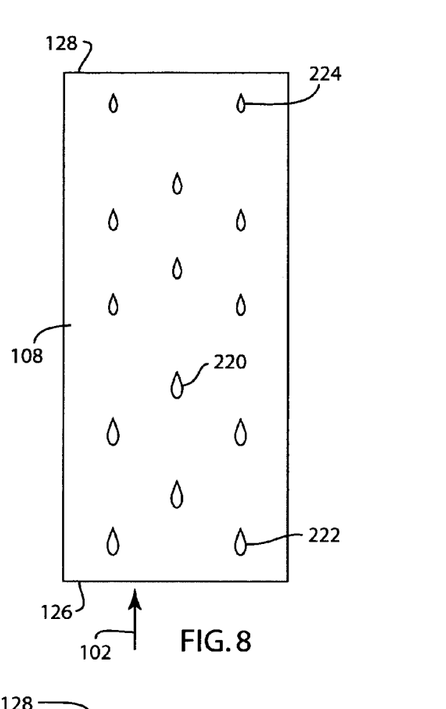
FIG. 8 is like FIG. 6 and shows another embodiment.
Figure 9:
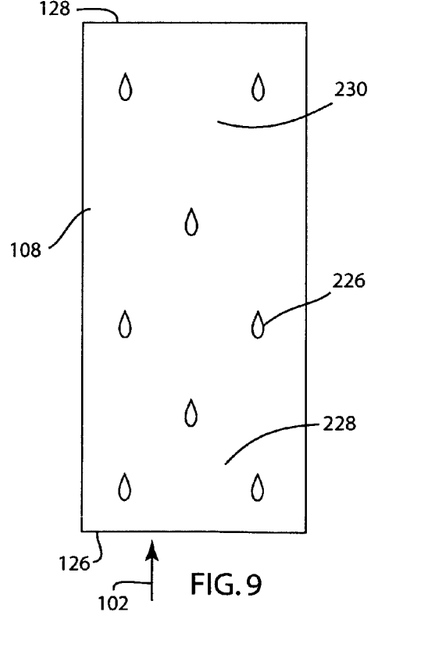
FIG. 9 is like FIG. 6 and shows another embodiment.
Figure 10:
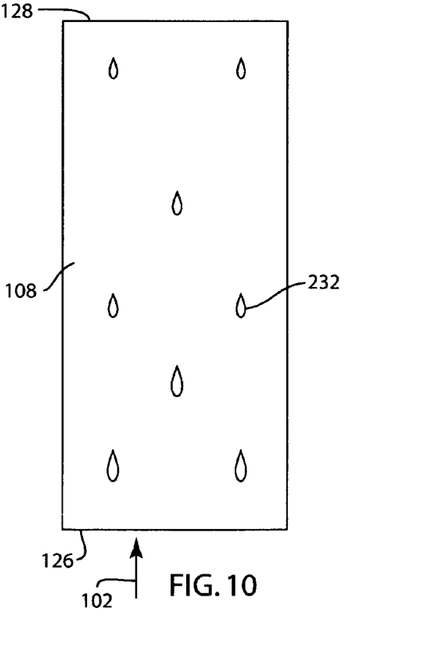
FIG. 10 is like FIG. 6 and shows another embodiment.

Embossments 150 guide and direct fluid axially into and along flow channels 120 from upstream ends 126 of wall segments 108. The embossments extend axially along axial flow direction 102 and parallel to bend lines 116, 118. The embossments have a length 210, FIG. 6, extending along axial flow direction 102, and have a width 212 extending along transverse direction 110, FIG. 3. Length 210 is greater than width 212. This is significant to reduce turbulence and pressure drop. In further embodiments, the embossments are as shown at 214 in FIG. 7 and have an aerodynamic shape having an upstream portion 216 tapering to a narrower downstream portion 218, e.g. a teardrop or airfoil shape, reducing turbulence and drag to reduce resistance to flow of fluid therepast. In a further embodiment, FIG. 8, embossments 220 have a varying size from upstream to downstream, namely decreasing in size from upstream end 126 to downstream 128, for example as shown at wider width upstream embossments 222 and narrower width downstream embossments 224. In a further embodiment, FIG. 9, the wall segments 108 have patterns of embossments 226 thereon which vary from upstream to downstream, for example having a greater density of embossments upstream at 228 than downstream at 230. In a further embodiment, FIG. 10, both the size and density of embossments 232 varies from upstream to downstream.

Referring to FIG. 5, it is preferred that the embossments are geometrically aligned from wall segment to wall segment such that embossments such as 160, 164, 168 on one of the wall segments such as 108a extend laterally (leftwardly in FIG. 5) into a respective flow channel and align with and touch embossments such as 162, 166, 170 on another facing wall segment such as 108b, such that the channel width 122, FIGS. 3, 4, is the sum of the height of one wall segment embossment such as 160 plus the height of the other wall segment embossment such as 162 in alignment therewith. The flow channels 120 have a cross-sectional flow area defined by transverse dimension 110, FIG. 3, and lateral dimension 124. The cross-sectional flow area varies from upstream to downstream, e.g. due to the noted variance of the embossments as in FIGS. 7-10 and/or the variance in convex/concave surfaces as in FIG. 6. The cross-sectional flow area decreases from upstream to downstream. The channel width 122 narrows from upstream to downstream. The embossments may extend only along the wall segment between the pleat tips at bend lines 116, 118 or may also be on one or both of the bend lines for example as shown in dashed line at 236.

Figure 11:
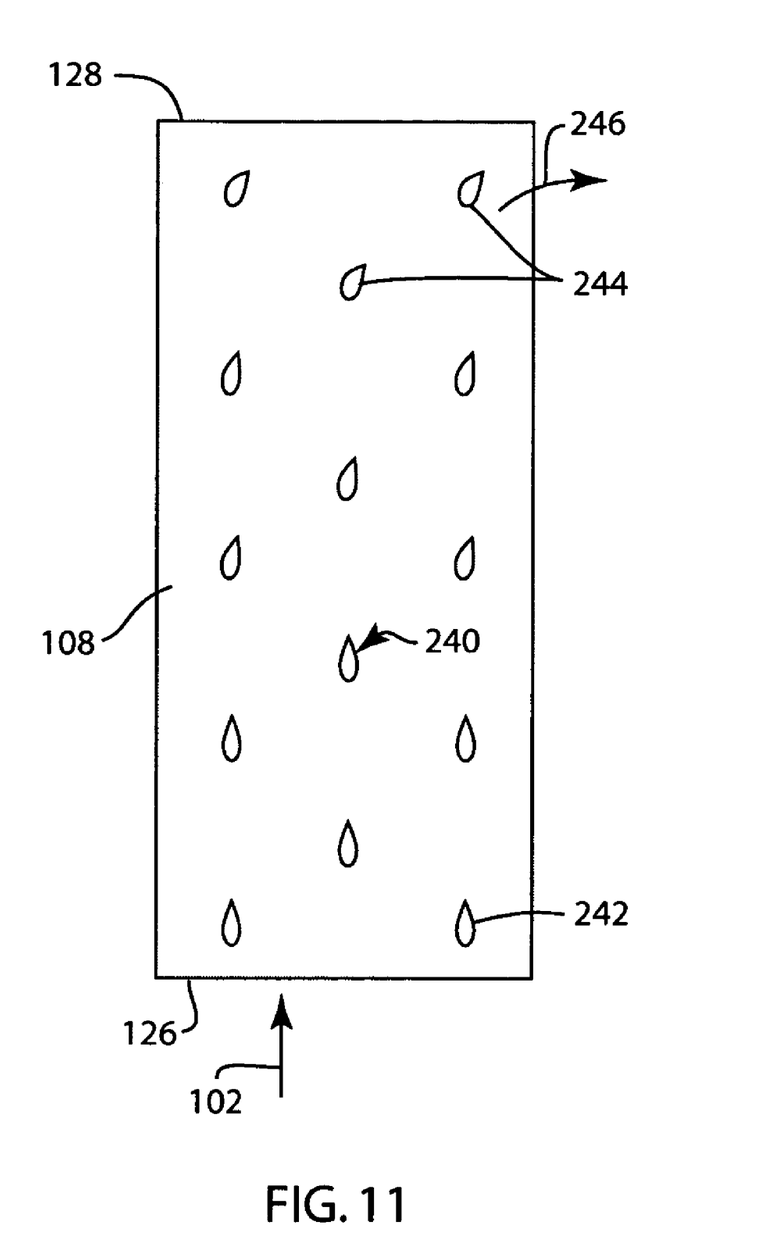
FIG. 11 is like FIG. 6 and shows another embodiment.
Figure 12:
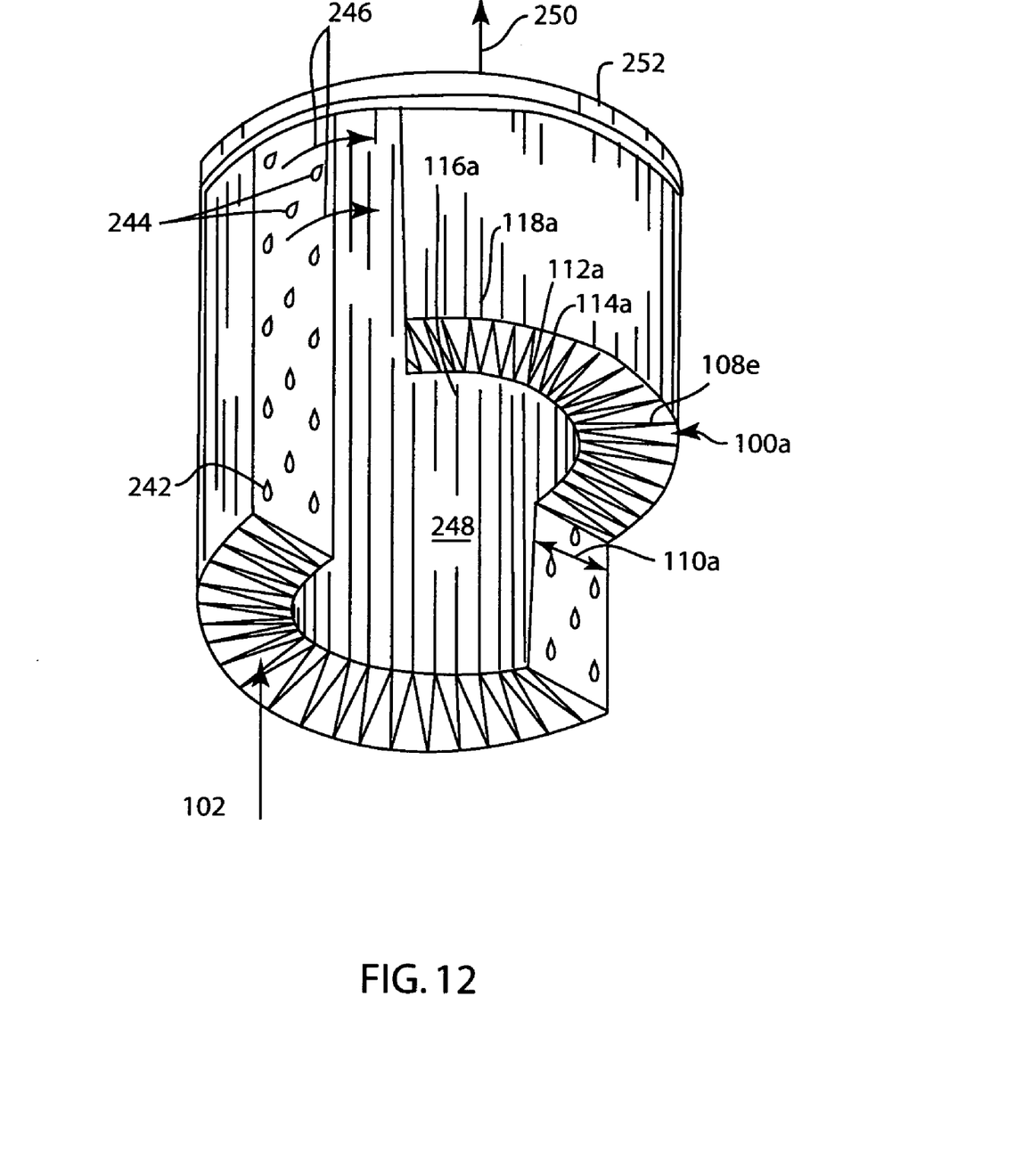
FIG. 12 shows another embodiment of a filter in accordance with the invention using the pleated wall segment embodiment of FIG. 11.

In a further embodiment, FIG. 11, embossments 240 include a first set of embossments 242 directing incoming fluid axially at 102 along the flow channels 120, and a second set of embossments 244 downstream of the first set of embossments 242 and directing the fluid to turn as shown at arrow 246 to the noted transverse direction 110, FIG. 3, for example for flow into a side plenum or side discharge outlet. The embodiment of FIG. 11 may be used in an implementation where filter element 100a, FIG. 12, is formed into an annular cylinder, with wall segments 108e extending radially along a radial direction 110a between inner and outer sets of pleat tips 112a and 114a at inner and outer sets of axially extending bend lines 116a and 118a. Inner and outer sets of pleat tips 112a and 114a are the above noted first and second sets of pleat tips 112 and 114. Inner and outer sets of axially extending bend lines 116a and 118a are the above noted first and second sets of axially extending bend lines 116 and 118. Radial direction 110a is the above noted transverse direction 110. Second set of embossments 244 direct the fluid to turn as shown at 246 toward radial direction 110a, such that fluid enters the filter axially as shown at 102 and then flows radially inwardly as shown at 246 into hollow interior 248, which filtered fluid may then exit as shown at 250 through an aperture in end cap 252 and/or may exit at the downstream end of the wall segments if uncovered by end cap 252. The preferred embodiment is a flat panel filter as shown in the drawings above, though it may also be annular as shown in FIG. 12. The embossments are preferably deformations in wall segments 108 having oppositely facing convex and concave surfaces, though various alternatives are possible, such as protrusions or bumps adhesively affixed to the wall segments, and other spacers for maintaining channel width.

It is recognized that various equivalents, alternatives and modifications are possible within the scope of the appended claims.

What is claimed is:

1. A filter for filtering fluid flowing along an axial flow direction comprising a pleated filter element having a plurality of pleats defined by wall segments extending along a transverse direction between first and second sets of pleats tips at first and second sets of axially extending bend lines, said transverse direction being perpendicular to said axial direction, said wall segments defining axial flow channels therebetween, said channels having a channel width extending along a lateral direction between respective wall segments, said lateral direction being perpendicular to said axial direction and perpendicular to said transverse direction, said wall segments extending axially between upstream and downstream ends, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, a plurality of embossments on said wall segments, said embossments having a height extending along said lateral direction into a respective said flow channel to maintain said channel width, said embossments guiding and directing said fluid axially into and along said flow channels from said upstream ends of said wall segments, wherein said embossments comprise a first set of elongated embossments directing said fluid axially along said flow channels, and comprising a second set of elongated embossments downstream of said first set of embossments and directing said fluid to turn toward said transverse direction, the embossments of said first set being elongated from an upstream end to a downstream end parallel to said axial direction, the embossments of said second set being elongated from an upstream to a downstream end along a designated direction oblique to said axial direction.

2. The filter according to claim 1 wherein said first set of embossments each have a different width along said transverse direction than said second set of embossments.

3. The filter according to claim 2 wherein said first set of embossments each have wider widths than said second set of embossments.

4. The filter according to claim 1 wherein said designated direction is also oblique to said transverse direction.

5. The filter according to claim 1 wherein said embossments have an aerodynamic shape reducing resistance to flow of said fluid therepast and reducing drag, wherein said aerodynamic shape comprises a teardrop shape that has an upstream portion tapering to a wider middle portion tapering to a narrower downstream portion reducing turbulence, wherein said embossments extend along said aerodynamic shape from said upstream portion to said downstream portion along said axial direction parallel to said bend lines.

* * * * *